United States Patent Office 3,312,526
Patented Apr. 4, 1967

3,312,526
METHOD AND CATALYST FOR COMBINING HYDROGEN AND OXYGEN IN THORIUM OXIDE SLURRIES
Charles K. Hanson, Salt Lake City, Utah, Ralph M. Horton, Pullman, Wash., and Milton E. Wadsworth, Salt Lake City, Utah, assignors to the United States of America as represented by the United States Atomic Energy Commission
No Drawing. Filed Oct. 15, 1962, Ser. No. 230,766
8 Claims. (Cl. 23—204)

Our invention relates to a catalyst for combining hydrogen and oxygen in thorium oxide slurries.

Thorium is useful as a source of fissionable material, thorium 232 being converted to fissionable uranium 233 as a result of irradiation with thermal neutrons. Irradiation of thorium may be effected by circulating a heavy-water thorium oxide slurry through a blanket region surrounding the core of a nuclear reactor. Thorium oxide may also be employed in combination with uranium oxide in a heavy-water slurry which is circulated through a single-region reactor. Further information regarding the use of thorium oxide slurries in nuclear reactors may be seen by reference to Fluid Fuel Reactors, pages 128–189, by J. A. Lane, H. G. McPherson and Frank Maslan, this book having been presented at the Second International Conference on the Peaceful Uses of Atomic Energy, Geneva, Switzerland (1958).

One of the problems presented in the use of aqueous thorium oxide slurries in nuclear reactors is radiolytic decomposition of water. Upon being subjected to ionizing radiation, water decomposes to form gaseous hydrogen and/or deuterium and oxygen, and the presence of these gases causes serious difficulties. If the gases are allowed to accumulate an explosion hazard is presented. Bubbling of these gases interferes with reactor control and may result in erratic operation. Recombination of radiolytic hydrogen and oxygen is thus essential, particularly for reactors operating at high power levels.

Various catalysts such as molybdenum oxide, palladium and platinum have been employed for combining hydrogen and oxygen in thorium oxide slurries, but the activity of these catalysts has been undesirably low. Improved catalytic activity has been obtained previously for platinum by reacting platinic acid with peptized thorium hydroxide and dispersing the resulting platinized thoria in the thorium oxide slurry. Further improvement is desired, however, to allow the use of a minimum amount of catalyst, with a resulting minimum decrease in the neutron economy of the reactor system.

It is, therefore, an object of our invention to provide an improved catalyst for combining hydrogen and oxygen in thorium oxide slurries.

Another object is to provide a method of preparing a platinum catalyst for combining hydrogen and oxygen in thorium oxide slurries.

Another object is to provide a method of preparing an improved platinized thoria catalyst for recombining hydrogen and oxygen resulting from radiolytic decomposition of water in an aqueous thorium oxide slurry.

Other objects and advantages of our invention will be apparent from the following detailed description and claims appended hereto.

In accordance with our invention a platinized thoria catalyst is prepared by reacting an aqueous thorium oxide sol with platinic acid at a thorium-to-platinum ratio of about 2–3 to 1. The resulting platinized thoria is dispersed in a pressurized thorium oxide slurry to catalyze combination of hydrogen and oxygen. The activity of the catalyst prepared by this method is greatly increased over previous catalysts. For example, platinized thoria prepared from peptized thorium hydroxide at a thorium-to-platinum ratio of 2.44 to 1 exhibits an activity such that the reaction rate of hydrogen with oxygen is over one hundred times greater than for catalysts prepared at the previously used ratio of 10 to 1.

We have found that catalytic activity is greatly enhanced within a narrow range of thorium-to-platinum ratios in the preparation of platinized thoria. Although our invention is not to be understood as limited to a particular theory, it is postulated that a stoichiometric combination of the thoria sol and platinic acid occurs within the critical range of thorium-to-platinum ratios. At other ratios, e.g., the tenfold excess of thorium previously employed in the preparation of platinized thoria, the platinum and thoria are believed to combine in a different manner, as evidenced by the lower catalytic activity of the product.

It is to be understood that the catalyst prepared by the method of our invention is equally applicable to the combination of oxygen with both ordinary hydrogen and deuterium. Accordingly, the term "hydrogen" as used in this specification and the appended claims includes light hydrogen, deuterium and any combination of these isotopes. In the preparation of a catalyst for use in a heavy-water slurry, it is preferred to employ heavy water as the preparation medium in order to avoid isotopic dilution of the slurry.

The method of preparing the thorium oxide sol is not critical to our invention, and any of the previously known methods may be employed. Formation of a sol may be conveniently effected by precipitating thorium hydroxide in an aqueous solution and heating the resulting mixture, e.g., to 90° C., under vigorous agitation in the presence of nitrate ion. Thorium oxide obtained by calcination of thorium oxalate at a temperature not exceeding about 650° C. may also be converted to a sol by dispersion in a heated nitrate solution. Repeated dispersion and evaporation may be required with the latter material. Formation of a sol is evidenced by the change in appearance of the thoria-containing liquid from an opaque suspension to a translucent mass exhibiting colloidal properties. The concentration of thorium in the resulting sol is not critical, but about 0.5 to 10.0 grams per liter is preferred to provide a convenient volume of material.

Platinic acid, $H_2Pt(OH)_6$, may be prepared by dissolving platinum tetrachloride in a dilute sodium hydroxide solution and slightly acidifying the solution with nitric acid. The resulting gelatinous platinic acid precipitate is then converted to purified form by repeated dissolution, reprecipitation and washing. Dispersion of the purified precipitate in water results in a peptized, colloidal-type solution. Although the dispersed mixture is not necessarily a true sol, that is, clouding of the liquid and a slight amount of settling eventually occurs upon standing, this material is effective for preparation of the platinized thoria catalyst. The concentration of platinum in the peptized solution is not critical, and a suitable concentration is about 0.1 to 1.0 gram per liter.

The thoria sol and platinic acid preparations described above are reacted by mixing these reagents and heating. A period of at least about 15 minutes is required to effect the reaction under reflux conditions, and about one hour is preferred. A thorium-to-platinum ratio of about 2–3 to 1 is critical to the attainment of a high activity catalyst, a ratio of approximately 2.4 to 1 being preferred. The product of this reaction is in the form of a flocculated suspension.

The platinized thoria is dispersed in a thorium oxide slurry at the concentration required for the level of radiolytic gas generation experienced by the particular slurry system. The flocculated catalyst particles are readily broken up by mixing with the slurry. The concentration of thorium oxide in the slurry wherein this catalyst is employed is not critical, provided that it is more than about $4 \times 10^7$ that of the platinum, and this catalyst is effective for the thoria concentrations normally used, i.e., about 500 to 1500 grams per liter. High power densities are supported by low levels of the platinized thoria catalyst, for example, at a power density of 3 to 6 kilowatts per liter, about $10^{-6}$ molar is effective above about 240° C. The flocculated catalyst particles are maintained in a dispersed state by the mixing which occurs during continuous circulation of the slurry.

It is to be understood that our invention is also useful for combining hydrogen and oxygen in thorium oxide slurries containing a minor proportion, i.e., up to about 6 weight percent, uranium oxide.

The platinized thoria catalyst prepared as described above is effective for pressurized aqueous thorium oxide slurry systems, e.g., where the slurry is circulated through a closed system at an elevated temperature such as 150° C. to 300° C. and a pressure such as 70 to 2000 pounds per square inch.

The effectiveness of the platinized thoria catalyst is maintained at a high level for an extended period. Catalytic activity is slightly increased with time, probably owing to adsorption of the catalyst on surface sites of the inert thoria.

Our invention is further illustrated by the following specific examples.

*Example I*

Platinized thoria catalysts were prepared at varying thorium-to-platinum ratios to determine the effect of this ratio on catalytic activity. A stock sample of platinic acid, $H_2Pt(OH)_6$, was prepared by means of the following procedure. A platinum wire was dissolved in aqua regia to produce chloroplatinic acid ($H_2PtCl_6 \cdot 6H_2O$). Nitrate ion was then removed from the resulting solution by repeated evaporation with hydrochloric acid. The solution was then heated in a tube provided with an inlet through which a stream of dry chlorine gas was introduced. The liquid was evaporated and the residue was contacted with chlorine for a period of three hours at a temperature of 275° C. to produce platinium tetrachloride. The platinum tetrachloride was dissolved in an aqueous sodium hydroxide solution and any insoluble material was removed by filtration. The resulting solution was acidified with nitric acid to produce a gelatinous platinic acid precipitate. The precipitate was repeatedly washed, dissolved in a silute sodium hydroxide solution and reprecipitated with nitric acid to obtain a chloride-free product. The product was then washed and centrifuged repeatedly and the liquid, which contained peptized platinic acid, was decanted. The platinum concentration of the resulting solution was 0.5 milligram per milliliter. A stock sample of a thoria sol was prepared as follows: 1.19 grams thorium nitrate tetrahydrate was dissolved in 100 ml. distilled water. Thorium hydroxide was then precipitated by the addition of a dilute ammonium hydroxide solution. The precipitate was repeatedly washed and heated to 90° C. in 80 ml. water. 0.119 gram thorium nitrate tetrahydrate was then added and the resulting heated mixture was vigorously agitated. After 30 to 40 minutes the mixture had peptized to give a clear liquid, which was diluted to 100 ml. The platinized thoria catalyst was then obtained by refluxing aliquots of the peptized platinic acid and the peptized thoria at the desired ratio for one hour in a 100 ml. test tube. The product was in the form of a cloudy yellow liquid.

The activity of the catalysts prepared as described above was determined by means of a series of hydrogen-oxygen combination experiments in a pressurized thorium oxide slurry. The equipment employed in these runs consisted of an autoclave, furnace, shaker, gas injection apparatus and instruments to measure temperature and pressure. The autoclave was constructed of type 347 stainless steel and had a capacity of 16.8 cc. The furnace consisted of a cylindrical aluminum core wound with Nichrome wire and encased in a steel cylinder. A glass-wool jacket was provided for insulation. The furnace was mounted on a box-type shaking machine rated at 270 oscillations per minute with a stroke of 1½ inches. The temperature of the furnace was manually controlled. The gas-injection apparatus consisted of piston-type pressure generators for hydrogen and oxygen with capacities of 20 and 10 cc., respectively, connected by capillary tubing through pipettes to inlets in the autoclave. Conventional instrumentation was provided to measure and continuously record the autoclave pressure. In each experiment the autoclave was charged with a slurry containing thorium oxide at a concentration of 50 grams per liter, the thorium oxide having been prepared by calcination of thorium oxalate at 650° C., and a sufficient amount of catalyst to provide a platinum concentration of $1.17 \times 10^{-6}$ molar. The charged autoclave was heated to 280° C. and was shaken at 270 strokes per minute. The autoclave was then charged with oxygen and hydrogen at partial pressures of about 400 and 500 p.s.i., respectively, at 280° C. The rate of combination of hydrogen and oxygen was determined from the decrease in system pressure with time at 280° C. The rate was calculated from gas-law equations in terms of the unit moles of oxygen consumed per hour per liter slurry at an oxygen partial pressure of 100 pounds per square inch, this value being selected since it corresponds to a radiolytic gas pressure which is safely below an explosive concentration at the desired slurry operating temperature, e.g., 280° C. The rate as defined above was further expressed in terms of a catalyst performance index, hereinafter referred to as "CPI," which represents the power density in watts per milliliter that can be supported by a catalyst concentration of one millimolar. The CPI value was obtained by dividing the reaction rate as defined above by a factor for converting electron volts to watts (0.38) and by an efficiency factor for gas production by neutron flux (0.7). The results reported below are normalized to 0.001 molar platinum concentration in accordance with this treatment. The results obtained may be seen by reference to the following table.

TABLE.—EFFECT OF THORIUM-TO-PLATINUM RATIO ON CATALYTIC ACTIVITY

| Experiment No. | $\dfrac{Th}{Pt}$ Ratio | Partial Pressure $H_2$ / Partial Pressure $O_2$ | CPI |
|---|---|---|---|
| 1 and 2 | 100/1 | 1.5 | 60 |
| 3 and 4 | 25/1 | 1.3 | 150 |
| 5 and 6 | 2.4/1 | 1.3 | 8,000 |
| 7 | 1/1 | 1.4 | 70 |
| 8 | 1/2 | 1.3 | 50 |

It may be seen from the above that catalytic activity is vastly increased over the other ratios at a ratio of 2.4 to 1.

*Example II*

A series of experiments was conducted by the procedure of Example I to determine whether the activity of the catalyst remains high for an extended period. In the experiments the same sample of a catalyst prepared at a Th/Pt ratio of 2.4 to 1 was employed in a series of seven tests. Reaction conditions were the same as for Example I except that the autoclave was heated to 240° C. instead of 280° C. The CPI values obtained in the seven experiments were 5500, 4000, 4600, 5200, 3400, 5500 and 6800, respectively. These results indicate that catalytic activity is sustained at a high level for an extended period.

The above examples are merely illustrative and are not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:

1. The method of combining hydrogen and oxygen in a pressurized aqueous thorium oxide slurry which comprises heating an aqueous thoria sol and platinic acid at a thorium-to-platinum ratio of 2–3 to 1 until a flocculated suspension is formed, recovering the resulting suspended solids and dispersing said solids in said slurry.

2. The method of claim 1 wherein said ratio is about 2.4 to 1.

3. The method of recombining hydrogen and oxygen resulting from the subjection of an aqueous thorium oxide slurry to ionizing radiation in a pressurized system at a temperature of 150° C. to 300° C. which comprises heating a mixture of an aqueous thorium oxide sol and platinic acid at a thorium-to-platinum ratio of 2–3 to 1 until a flocculated suspension is formed, recovering the resulting suspended solids and dispersing said solids in said slurry.

4. The method of claim 3 wherein said ratio is about 2.4 to 1.

5. The method of claim 4 where in said slurry contains uranium oxide at a proportion up to about 6 weight percent.

6. A catalyst for recombining hydrogen and oxygen in an aqueous thorium oxide slurry, consisting of a platinized thoria composition characterized by a thorium-to-platinum ratio of 2–3 to 1.

7. A catalyts as claimed in claim 6 wherein the platinized thoria composition is flocculated.

8. A catalyst as claimed in claim 6 wherein the thorium-to-platinum ratio is approximtaely 2.4 to 1.

References Cited by the Examiner

Hanson et al., "A Platinic Acid-Thorium Hydroxide Catalyst for Hydrogen-Oxygen Recombination," Technical Report Number X, October 5, 1960, Institute of Metals and Explosives Research, University of Utah, Salt Lake City, Utah, pages 1 and 2.

OSCAR R. VERTIZ, *Primary Examiner.*

EARL C. THOMAS, *Examiner.*